United States Patent
Rentschler et al.

(10) Patent No.: US 6,837,261 B2
(45) Date of Patent: Jan. 4, 2005

(54) CONTROL VALVE ASSEMBLY OF VALVE ASSEMBLY-INJECTION-MOLDED CONTROL VALVES OR MODULES

(75) Inventors: Klaus Rentschler, Gaeufelden (DE); Helmut Neuschwander, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/603,767

(22) Filed: Jun. 26, 2003

(65) Prior Publication Data

US 2004/0003841 A1 Jan. 8, 2004

Related U.S. Application Data

(62) Division of application No. 09/983,556, filed on Oct. 24, 2001, now Pat. No. 6,612,325, which is a continuation of application No. PCT/EP00/03673, filed on Apr. 20, 2000.

(30) Foreign Application Priority Data

Apr. 24, 1999 (DE) .......................... 199 18 777

(51) Int. Cl.⁷ ................................ F02D 9/10
(52) U.S. Cl. ................ 137/315.22; 137/595; 123/336; 251/308; 384/271; 264/255
(58) Field of Search .................. 137/15.25, 315.22, 137/595, 625.18; 123/336, 337; 251/305, 308; 264/255; 384/271

(56) References Cited

U.S. PATENT DOCUMENTS

| | | | | |
|---|---|---|---|---|
| 2,529,572 A | * | 11/1950 | Raybould ................ 251/308 |
| 3,774,879 A | * | 11/1973 | Zink ........................ 251/308 |
| 3,779,512 A | * | 12/1973 | Scaramucci ............. 251/308 |
| 3,897,524 A | | 7/1975 | Freismuth et al. |
| 4,125,248 A | * | 11/1978 | Teramura ................ 251/308 |
| 4,259,980 A | * | 4/1981 | Muller .................... 251/306 |
| 4,348,006 A | * | 9/1982 | Schmitt et al. .......... 251/308 |
| 4,860,706 A | | 8/1989 | Suzuki et al. |
| 4,907,547 A | * | 3/1990 | Daly ....................... 137/595 |
| 5,036,816 A | * | 8/1991 | Mann ...................... 123/336 |
| 5,181,491 A | * | 1/1993 | Izumi et al. ............. 123/336 |
| 5,275,375 A | * | 1/1994 | Semence ................. 251/308 |
| 5,304,336 A | | 4/1994 | Karlsson et al. |
| 5,360,030 A | * | 11/1994 | Sisk ........................ 251/308 |
| 5,374,032 A | * | 12/1994 | Pearson et al. .......... 251/308 |
| 5,575,256 A | * | 11/1996 | Peters et al. ............ 123/337 |
| 5,615,861 A | * | 4/1997 | Pollmann et al. ....... 251/306 |
| 5,632,304 A | * | 5/1997 | Kempka et al. ......... 137/595 |
| 5,657,731 A | * | 8/1997 | Kim ........................ 123/336 |

(List continued on next page.)

FOREIGN PATENT DOCUMENTS

| | | |
|---|---|---|
| DE | 4323078 | 1/1995 |
| DE | 19615438 | 1/1997 |
| DE | 29913538 | 12/1999 |
| EP | 0747587 | 12/1996 |

* cited by examiner

*Primary Examiner*—John Rivell
(74) *Attorney, Agent, or Firm*—Crowell & Moring LLP

(57) ABSTRACT

A control valve assembly comprising at least two control valves which may be used, for example, to throttle the air intake of an internal combustion engine. The assembly is provided with a centrally arranged, force-transmitting shaft (32). The control valves are formed by blades (15) in frames (16) produced by an assembly injection molding process. The control valve blades (15) can be molded onto the force-transmitting shaft (32). The resulting assembly can be mounted or installed as a unit. Alternatively, instead of using a single continuous shaft, shaft projections can be injection molded on the valve blades, which terminate in lugs which engage in a rotationally secure manner in sockets in an adjacent valve assembly so that the two assemblies rotate together as a unit. The resulting control valve assembly is easy to install and advantageously takes up only a little space.

14 Claims, 2 Drawing Sheets

U.S. PATENT DOCUMENTS

| | | | | |
|---|---|---|---|---|
| 5,696,318 A | * | 12/1997 | Ernst et al. | 123/432 |
| 5,715,782 A | | 2/1998 | Elder | |
| 5,794,591 A | * | 8/1998 | Kalebjian et al. | 29/890.132 |
| 5,875,758 A | * | 3/1999 | Fujita | 123/336 |
| 6,047,680 A | * | 4/2000 | Shimura et al. | 123/336 |
| 6,167,867 B1 | * | 1/2001 | Garrick | 251/308 |
| 6,263,917 B1 | * | 7/2001 | Evans | 251/308 |
| 6,341,589 B1 | * | 1/2002 | Jessberger et al. | 123/184.53 |
| 6,427,661 B1 | * | 8/2002 | Spannbauer | 251/305 |
| 6,517,334 B1 | * | 2/2003 | Neuschwander | 264/255 |
| 6,598,854 B1 | * | 7/2003 | Jessberger et al. | 251/305 |

CONTROL VALVE ASSEMBLY OF VALVE ASSEMBLY-INJECTION-MOLDED CONTROL VALVES OR MODULES

CROSS REFERENCE TO RELATED APPLICATIONS

This application is a continuation of international application no. PCT/EP00/03673, filed Apr. 20, 2000, designating the United States of America, the entire disclosure of which is incorporated herein by reference. Priority is claimed from Federal Republic of Germany patent application no. 199 18 777.0, filed Apr. 24, 1999.

BACKGROUNG OF THE INVENTION

The invention relates to a control valve assembly comprising at least two control valves produced by assembly injection molding, a process in which a molded part is produced assembled to another part by injection molding it in place in the other part. The invention further relates to a control valve module comprising a plurality of such control valve assemblies.

The use of control valves that are injection molded at the time of assembly is known, for example, in the automotive field. Karlsson et al., U.S. Pat. No. 5,304,336 (=EP 482 272) in FIG. 5 illustrates the production process for assembly-injection-molded control valves. These control valves are produced in a mold. Core inserts 3, 4, 7, 8 can be moved within the mold in such a way that the valve blades and the shaft can be produced in one piece in the previously injection molded valve frame. Since the plastics of the valve blades and the valve frame do not adhere to one another, the vanes and frame can be moved relative to each other in the finished assembly.

Assembly-injection-molded control valves can be used as individual components or can be combined into an assembly, e.g., in internal combustion engine air intake pipes. For example, published European patent application EP 747 587 A1 proposes a series connection of assembly-injection-molded control valves which have a common axis of rotation (compare FIG. 3). These control valves are connected with one another by cranks 17, 18, with a plug-in connection 19, 20 provided at the ends of the cranks. By providing cranks, it is possible to transmit sufficiently large torques to actuate the control valve. Furthermore, relocating the connection outside the axis of rotation makes it possible to obtain sufficient angular accuracy between the control valves. Such a control valve assembly has drawbacks, however. Providing cranks increases the material required for the component and ultimately also the component costs. In addition, the cranks, as movable components, require room for action, which must be available at the mounting location. This is feasible in the described application since the control valves are adjacent to the plenum of a suction pipe (compare FIG. 1). There are applications, however, where installation space is severely limited.

Particularly if the control valves are to be arranged in the intake channels of an air suction pipe just ahead of the cylinder inlets, the available space is very limited due to the large number of functional components, such as the intake valves. If there is more than one intake channel per cylinder, it is frequently desirable to be able to selectively shut off some of the channels. In this case, the cranks, assuming a common axis of rotation of all valves, would be located precisely in the area of the second, non-closable intake channel where, depending on their position, they would have an adverse effect on the flow within the intake channel. In these cases one would therefore have to resort to constructing the valve assembly of metal, since the greater rigidity of this material makes it possible to arrange the control valves on a shaft. Such an arrangement is known, for example, from U.S. Pat. No. 5,603,269. The control valves are mounted on the shaft, for instance by means of screws. This causes higher production costs, however, compared to a control valve assembly that is injection molded at the time of assembly. In addition, assembly is more complex, since the suction pipe housing must be divided in the plane of rotation of the valves to facilitate installation of the valve assembly.

SUMMARY OF THE INVENTION

It is therefore an object of the invention to provide an assembly injection-molded control valve assembly which permits actuation of said assembly in a very limited installation space.

This and other objects of the invention are achieved by the invention as described and claimed hereinafter.

The control valve assembly according to the invention comprises a plurality of control valves or valve modules that are suitable, for instance, to throttle intake channels of an air intake manifold for an internal combustion engine. In the following discussion, it should be understood that control valves may be constructed as valve modules, e.g., constructed of assembly injection-molded control units. The control valves are produced by assembly injection molding techniques and comprise valve blades, which should be understood to refer to the entire part which is movable in the valve frame, including the shaft extensions by which the flap is rotatably mounted. In order to transmit an actuating force from one valve blade to another, a shaft is provided that can be turned to simultaneously rotate the valve blades. Because this shaft must lie precisely in the axis of rotation of the valve blades, little space is required for the control valve assembly. Thus, such an assembly can be installed, for example, in the intake channels of an internal combustion engine air intake manifold leading to the engine cylinders so as to save space. It is also possible to achieve selective inlet closure if there are several intake channels per cylinder. In this case, the valve shaft extends through each of the non-closable intake channels without blocking them.

According to one advantageous embodiment of the invention, at least one of the bearings in the valve frame on both sides of the valve blades has a conical configuration. These conical bearings are formed by the valve shaft and the mounting hole or receptacle in the valve frame. The conical outer contour of the valve shaft in the area of the bearings is preferably formed by the injection-molded component that also produces the valve blade. The receptacle hole in the valve frame need not necessarily be produced by drilling. It is also possible to originally form this hole by using appropriate core inserts in the injection mold in which the mounting frame is formed. In this case, the mounting holes in the valve frame must have a conical configuration that corresponds to the conical configuration on the valve shaft.

The base of the cone may face either the exterior of the valve frame or the interior of the valve frame. Which of the two directions of the opening is more appropriate in the individual case depends on the material selected, as will be described in greater detail below.

Normally, when the temperature or the air humidity decreases, the valve will shrink more than the valve frame. In such a case it is better to provide a conical bearing configuration which diverges toward the exterior of the frame. Shrinkage of the valve shaft has an axial and a radial component. The radial shrinkage component enlarges or produces a gap between the conical seat in the valve frame and the conical surface on the valve shaft. At the same time, however, axial shrinkage of the valve shaft causes the axis to be shortened so that the gap thus produced is compensated. It is therefore necessary to fix the valve shaft axially. This can advantageously be accomplished by providing a second conical area at the other end of the valve shaft. However, a shoulder on the shaft can also ensure axial fixation. Of course, the valve blades also provide axial fixation of the valve shaft. They limit the axial play of the valve shaft in the opening of the valve frame.

The angle of divergence of the cone can be selected as a function of the materials used and the dimensions of the control valve such that the axial and radial shrinkage component of the valve shaft is compensated. Alternatively, the angle of divergence can also be selected in such a way that a slight axial stressing (tensioning) of the valve shaft is achieved when the temperature decreases. This makes it possible to compensate tolerances in the valve shaft and the valve frame while ensuring a play-free bearing arrangement of the valve shaft in the valve frame throughout the tolerance range. Valve shaft undersizing in the low temperature range will simultaneously compensate wear.

A significant advantage of the conical configuration of the bearings, however, is that it limits bearing friction irrespective of the operating temperature. In this way it is possible to maintain the operating torques needed to adjust the valves within limits. This has the advantageous effect that even if the actuating shaft has little torsional rigidity, which is true, for instance, if it is made entirely of synthetic resin material, high requirements regarding angular misalignment between the control valves can be met. Of course, low switching forces also affect the dimensioning of the valve actuator, which under these conditions can have smaller dimensions. This saves weight as well as production costs and can furthermore create the conditions making it possible to drive the valve actuator by means of the negative pressure present in the intake pipe.

In a further embodiment of the invention the valve frames are provided with positioning pins. These positioning pins correspond with mounting holes in the seats for the control valve assembly, so that mounting is simplified. In addition, a precise fit is then necessary only between the holes and the positioning pins, while the seats can have larger tolerances. This has a positive effect on the manufacturing economics of producing the suction pipe. If the positioning pins advantageously are slightly oversize so that they have an interference fit relative to the holes, the control valve assembly is already fixed when it is inserted into the holes. It cannot fall out while the intake pipe is being handled prior to mounting. In the finally mounted state of the intake pipe, the control valve assembly is fixed in position by the adjacent seals.

In one advantageous embodiment of the invention, the control valve assembly is constructed of individual valve modules. These modules preferably consist of individual control valves, but may also be combined, e.g., into units of two control valves. The valve module furthermore has at least one shaft seat to allow adjacent valve modules to be connected so that they will move together as a unit.

It is furthermore advantageous to provide the valve modules with an injection-molded shaft extension. The length of this shaft extension is selected in such a way that it bridges the distance to the next valve module. At its end, the shaft extension is provided with a shaft lug that engages the above-described shaft seat of the next module. This creates a connection that is rotationally secure, thereby enabling a single drive unit to transmit the switching torque to all the valves. It is of course also possible to provide the shaft seat in the shaft extension and to injection mold a connecting lug onto the adjacent valve module:

Direct torque transmission between the valve modules by an injection-molded valve extension made of synthetic resin material presumes that the operating torque of the individual valves is low enough that the angular tolerances required between the individual flaps can be met. This can be accomplished by using the above-described conical bearings in the valve modules.

In a modification of the valve modules, an insert with greater torsional rigidity is molded within the valve shaft extensions. This insert may, for example, be a steel tube. This increases the overall torsional rigidity of the control valve assembly and also makes possible the transmission of greater switching torques. In the case of low switching torques, the angular accuracy between the individual valves can be further increased by the described measure. The insert has the further advantage that the expansion of the shaft extensions between the valve modules caused by the operating temperatures can be limited. A design measure with respect to the axial expansion of the shaft extensions is to provide axial play compensation between the shaft lug and the mating shaft seat. This axial play compensation can be simultaneously used to compensate production-related component tolerances in axial direction. The valve modules can consequently manufactured with less precise tolerances, which improves the manufacturing economics of producing them.

The use of valve modules makes the assemblies very versatile. These control valves can be used throughout the automotive field. Throttle valves are required, for instance, for ventilation of the passenger compartment. The valve modules can also be provided with two shaft seats, in which case the intervals between the valve modules must be bridged by short shaft connecting pieces, which are produced as separate parts. This achieves greater flexibility for the use of the valve modules for different control valve intervals. Furthermore, the outermost valve module does not require a shaft connecting piece since it does not need to drive a valve shaft of an adjacent valve. On the other hand, the first control valve has to be connected to a drive unit to enable an adjustment of the control valves in the first place.

A further variant of the invention provides that the control valve assembly be held together by an actuating shaft designed as a single part. The control valves are assembly-injeciton-molded onto this actuating shaft. To this end, the valve blades must be constructed in such a way that there is a rotationally secure connection with the actuating shaft, while the assembly consisting of the valve blades and the actuating shaft must be movable within the individual valve frames.

In this embodiment, the valve frames of the individual valve blades need not be separate parts. It is equally feasible to injection mold a large valve frame for all valve blades being used. Particularly advantageous, however, is an embodiment with a plurality of control valves, each of which comprises a valve blade and a valve frame. This provides advantages regarding the axial tolerances between the components. The continuous actuating shaft can be made, for instance, of steel so that shrinkage of the valve blades in axial direction can be largely avoided. Under this condition, the metal actuating shaft can advantageously be completely surrounded by and embedded in the injection molded-valve material to shield it against corrosion.

According to a special embodiment of the invention, the actuating shaft can be crimped in the areas where the valve blades are assembly injection molded onto the shaft in order to increase the magnitude of the torques that can be transmitted from the actuating shaft to the valve blades. In addition to adhesion of the valve material to the actuating shaft, the form-fit connection with the injection-molded material obtained by crimping can then also be used for torque transmission. This crimping of the actuating shaft is useful particularly if the actuating shaft is tubular. Of course, there are other ways to obtain an outer contour of the actuating shaft that deviates from a circular cross section. It is possible, for instance, to form the actuating shaft from a profile section.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 2b is a sectional view taken along section line B—B through a valve module according to FIG. 2a;

FIG. 3b is a sectional view taken along section line C—C according to FIG. 3a.

DETAILED DESCRIPTION OF PREFERRED EMBODIMENTS

Production of the valve assembly with a one-piece actuating shaft requires a modification of the prior art injection molding process at the time of assembly. The forming tool used must make it possible simultaneously to produce at least all the control valves that are used in a control valve assembly. This is achieved by combining the molding for each control valve into one mold cavity. The mold cavities are rotatably supported on the forming tool. The seats for the shaft are formed by core inserts that are laterally inserted into the mold cavities and must be removed prior to casting in the shaft. This requires a certain operating clearance in axial direction relative to the shaft for the core inserts. Since this clearance is not generally available due to the required spacing between the control valves, the mold cavities can be twisted for optimal accessibility for handling tools. It is advisable to produce the valve frames in a position of the mold cavities in which the orientation of the holes located in the valve frame is at a 90° angle to the orientation of the common valve shaft. In this position, the pin-shaped moldings can be made from the associated seats without too much complexity and due to the identical ejection movement can even be combined in all the mold cavities on one handling device. Subsequently, the apertures can be rotated by 90°, so that the shaft can be introduced into the seats of the individual control valves.

Figure 1:
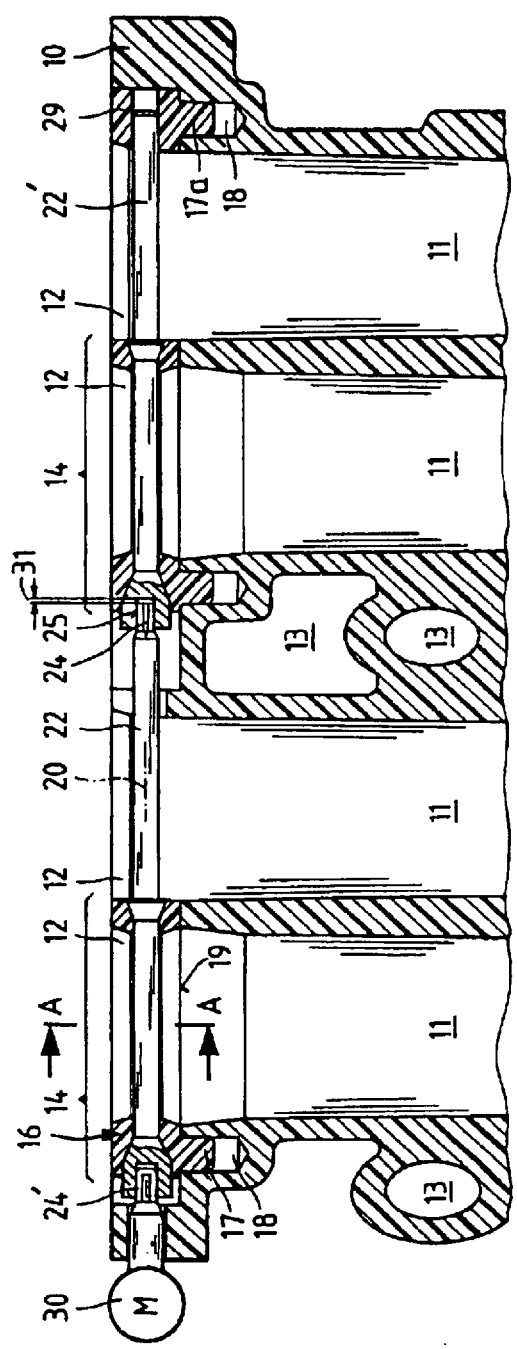
FIG. 1 is a section through the end of an internal combustion engine air manifold or suction pipe with two outlet ports per cylinder.

FIG. 1 shows a detail, cross-sectional view of a portion of a suction pipe, namely the part comprising a flange 10 to be mounted to the cylinder head of an internal combustion engine (not shown). In this area of the suction pipe, the inlet ports 11 lead from a plenum (not shown) to outlets 12 which lead to the engine cylinders. For each cylinder of the internal combustion engine, two inlet ports are provided. Coolant channels 13 may be arranged between the inlet ports.

One of the two inlet ports 11 leading to the cylinders can be closed by a control valve 14. These control valves comprise valve blades 15, which are produced by assembly injection molding in a valve frame. In addition, the control valve frame is provided with a positioning pin 17 which is received in a hole or receptacle 18 to fix the position of the control valve assembly seated flush against the suction pipe.

Figure 2B:
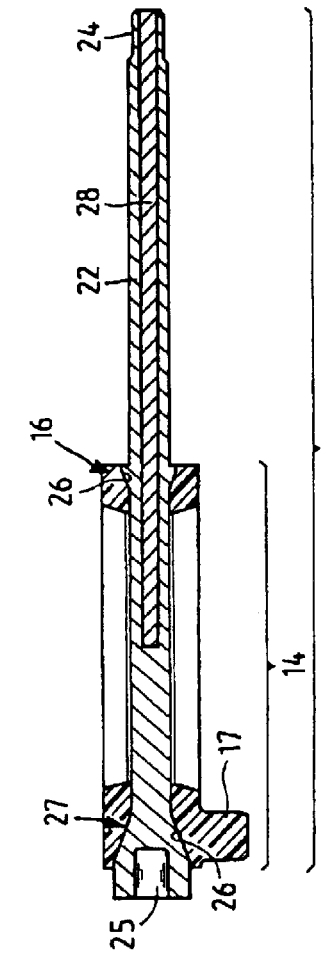
Figure 2A:
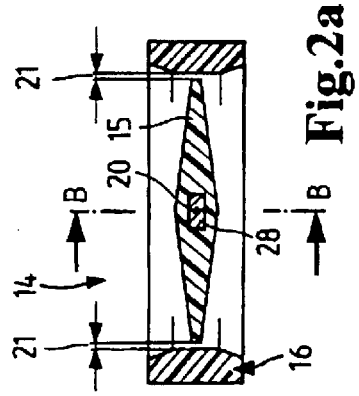
FIG. 2a is a sectional view taken along section line A—A through a valve module according to FIG. 1.

FIG. 2a shows the structure of the control valves 14. The valve blades 15 are supported on a or shaft rotatable about an axis 20 extending through the valve frame 16. To prevent relative rotation between the valve flaps and the shaft, the valve blades are assembly injection molded around non-circular portions formed on the shaft. Due to shrinkage of the injection-molded valve 15 after it is produced by assembly injection molding in the valve frame 16, a narrow gap 21 is created between the edge of the control valve flap 15 and the frame 16. This gap ensures proper functioning of the control valve and permits certain angular tolerances between the individual control valves. If angular tolerance variations do occur, this gap is even reduced by a certain amount since the diagonal of the valve in cross section may be longer than the diameter of the control valve standing horizontally in the valve frame.

FIG. 2b illustrates how the control valve 14 can be supplemented by adding a shaft extension 22 to a valve module 23. At its end, this shaft extension has a shaft lug 24 that can be inserted into the shaft seat of an adjacent valve module (not shown in this Figure). The illustrated shaft module also has a shaft seat 25, which is suitable to receive the drive shaft lug of an adjacent valve module (not shown). The shaft extension 22 is produced as one piece together with valve blade 15. This component has conical portions 26 that correspond with mating bearing surfaces 27 in valve frame 16. To increase the torsional rigidity of the shaft extension 22, a steel insert 28 may be used, which is completely embedded within the shaft by molding the shaft around the insert during the assembly injection molding process.

Looking again at FIG. 1, an example of how the valve module 23 is installed can be seen. In this example, two valve modules are used, and the valve extension 22', terminating in the shaft lug 24, is inserted into an end bearing 29. This bearing can be fixed in place as described above for the valve frame by positioning pins 17a in a mounting hole 18 of the suction pipe. The shaft seat 24' of the other valve module is used to connect a schematically indicated drive motor 30. This results in a control valve assembly that can be adjusted about the axis of rotation 20. It is used to close and/or open every second inlet port 11. A continuous or stepless adjustment is also feasible. One of the shaft extensions 22, 22' extends through each of the other inlet ports, respectively. The intake air can readily flow around this shaft extension, irrespective of the position of the control valves. The central connection shown between shaft journal 24 and shaft seat 25 between the two valve modules has an axial play compensation 31 to compensate for production and mounting tolerances in axial direction. The amount of this axial play compensation depends on the length of the shaft extension 22.

Figure 3A:
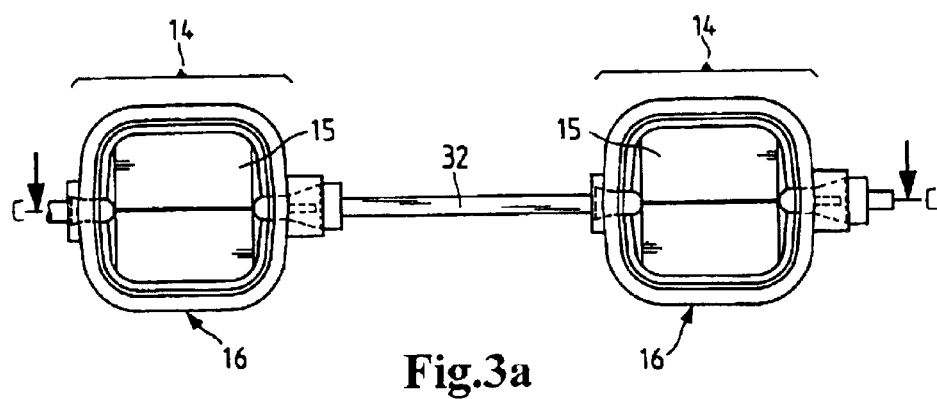
FIG. 3a is a top view of a valve assembly with a one-piece actuating shaft.

FIG. 3a shows a top view of a control valve assembly. This assembly is produced by an assembly injection molding process. The control valves 14 are molded onto and around a continuous actuating shaft 32. This shaft thus connects the individual valve blades 15 with one another in a torsionally rigid manner.

Figure 3B:
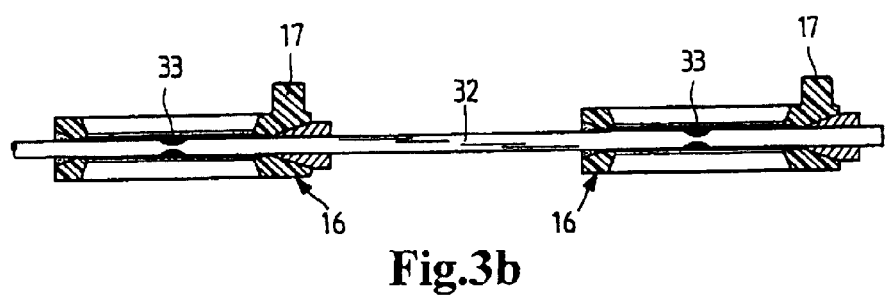

As shown in FIG. 3b, the valve blades 15 are supported in the associated valve frames 16 in the same manner as described in FIG. 2b. The actuating shaft 32 is provided with crimped areas 33, which secure the valve flaps against rotation relative to the shaft and thereby increase the torques that the actuating shaft is capable of transmitting to the valve.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A control valve assembly comprising at least two control valves, wherein each control valve comprises a valve blade that is assembly injection molded into a valve frame, said control valves having a common axis of rotation, and a force transmitting shaft which shaft connects the valve blades with one another along said common on axis of rotation, wherein said valve blades are supported on either side in the valve frame by bearing members, wherein at least one of said bearing members is assembly injection molded onto the shaft, and has a conical configuration which convergingly tapers toward an installation opening or socket in the valve frame.

2. A control valve according to claim 1, wherein said control valves are arranged in air intake ports of an internal combustion engine for throttling airflow therethrough.

3. A control valve assembly according to claim 1, wherein the valve frames carry positioning pins that engage in corresponding holes in seats for the control valve assembly.

4. A control valve assembly according to claim 3, wherein said positioning pins engage in said holes with an interference fit.

5. A control valve assembly according to claim 1, wherein said shaft comprises a member for increasing torsional rigidity of the control valve assembly, and wherein the torsional rigidity increasing member comprises an embedded insert around which the shaft extension is molded.

6. A control valve assembly according to claim 1, comprising a plurality of valve modules each comprising at least one shaft seat and at least one control valve.

7. A control valve assembly according to claim 6, wherein a first valve module comprises an injection molded shaft extension which is connected through a shaft lug in a rotationally secure manner with a drive shaft seat of an adjacent, second valve module so that the first and second valve modules rotate together as a unit.

8. A control valve assembly according to claim 7, wherein an axial play compensating mechanism is provided at the connection between the shaft lug and the shaft seat.

9. A control valve assembly according to claim 1, wherein said control valve assembly comprises a one-piece actuating shaft onto which the control valve blades are molded by assembly injection molding.

10. A control valve assembly according to claim 9, wherein said one-piece actuating shaft is torsionally rigid.

11. A control valve assembly according to claim 9, wherein the actuating shaft is completely embedded within the assembly-injection-molded valve material.

12. A control valve assembly according to claim 9, wherein the assembly-injection-molded valve blades are formed on portions of the actuating shaft having a non-circular outer contour.

13. A control valve assembly according to claim 12, wherein said non-circular contour comprises a crimped area of said actuating shaft.

14. A control valve module comprising a plurality of interengaged control valve assemblies according to claim 1.

* * * * *